(12) United States Patent
Stewart

(10) Patent No.: US 6,471,823 B1
(45) Date of Patent: Oct. 29, 2002

(54) USE OF PRESSURE AND TEMPERATURE MEASUREMENTS TO INFER PROCESS VARIABLES AND TO MONITOR EQUIPMENT CONDITIONS AND INFER PROCESS EFFICIENCY IN A MULTI-EFFECT EVAPORATOR SYSTEM

(75) Inventor: Wade C. Stewart, Pflugerville, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.

(21) Appl. No.: 09/302,686

(22) Filed: Apr. 29, 1999

Related U.S. Application Data
(60) Provisional application No. 60/083,705, filed on Apr. 29, 1998.

(51) Int. Cl.[7] .............................. B01D 1/26; B01D 3/42
(52) U.S. Cl. ...................... 159/47.1; 159/17.1; 159/44; 159/DIG. 8; 202/160; 202/174; 202/206; 203/1; 203/2; 203/71; 203/DIG. 18; 203/3
(58) Field of Search ...................... 203/1, 2, 3, DIG. 18, 203/100, 71; 159/17.2, 17.3, 201, 17.1, 44, DIG. 8, 47.1; 202/160, 206, 174; 364/501; 374/143

(56) References Cited

U.S. PATENT DOCUMENTS

| | | | | |
|---|---|---|---|---|
| 3,052,289 A | * | 9/1962 | Hildgard | 159/47.1 |
| 3,176,756 A | * | 4/1965 | Dukelow | 159/44 |
| 3,356,124 A | * | 12/1967 | Dambrine | 159/17.1 |
| 3,586,090 A | * | 6/1971 | Henderson | 159/49 |
| 3,773,627 A | * | 11/1973 | Weber et al. | 203/2 |
| 4,272,961 A | * | 6/1981 | Sadhukhan | 60/649 |
| 4,364,794 A | | 12/1982 | Lankenau | |
| 4,412,887 A | * | 11/1983 | Dye | 159/47.1 |
| 4,676,870 A | * | 6/1987 | Stewart et al. | 202/160 |
| 5,413,674 A | * | 5/1995 | Ragi | 159/47.3 |

OTHER PUBLICATIONS

Internet Web Site, Enders Process Equipment Corporation, Process Description: Fluid Bed Incineration System for Chemical Recovery from Spent Pulping Liquors, Apr. 23, 1998.

Internet Web Site, Forest Forum WWW—From Wood to Product, Prosesses of pulp and paper industry, Apr. 23, 1998.

Internet Web Site, Enders Process Equipment Corporation, Process Description: Evaporator for Concentrating Black Liquor from a Pump and Paper Mill, Apr. 23, 1998.

Internet Web Site, Pacific Gas and Electric Company, the Pacific Energy Center, Food Processing Evaporator Systems, Apr. 23, 1998.

Internet Web Site, MECO, Multi–Effect Distillation, Apr. 23, 1998.

Internet Web Site, Energy Technologies, Thermal Heat Recovery, Apr. 23, 1998.

* cited by examiner

Primary Examiner—Virginia Manoharan
(74) Attorney, Agent, or Firm—Wolf, Greenfield & Sacks, P.C.

(57) ABSTRACT

The invention disclosed herein provides methods for monitoring performance and efficiency for multi-effect evaporator systems. The invention also provides methods for monitoring the nonvolatile content of liquid products by determination of a boiling point rise. The invention involves monitoring methods that are improved over previous methods in view of their simplicity, and/or effectiveness, and/or, low cost. The methods of the invention enable system monitoring and problem diagnosis using measurements of a relatively small number of relatively easily accessible process operating parameters.

28 Claims, 2 Drawing Sheets

USE OF PRESSURE AND TEMPERATURE MEASUREMENTS TO INFER PROCESS VARIABLES AND TO MONITOR EQUIPMENT CONDITIONS AND INFER PROCESS EFFICIENCY IN A MULTI-EFFECT EVAPORATOR SYSTEM

RELATED APPLICATIONS

This application claims priority from provisional specification No. 60/083,705, filed Apr. 29, 1998, the subject matter of which is incorporated herein by reference.

FIELD OF THE INVENTION

The present invention relates to methods for monitoring the performance and efficiency of a multi-effect evaporator system by independently monitoring the efficiency for each effect. The invention also provides a method for determining a solid or nonvolatile content in a liquid from each effect of the system.

BACKGROUND OF THE INVENTION

The concentration of large volumes of liquid is an important industrial process in several industries, including the pulp and paper, the chemical industry, and the food industry. Concentration generally involves removing a portion of the volatile content of a liquid, the liquid also having a solid or nonvolatile content, by heating the liquid solution and evaporating a portion of the volatile content. Because of this heating step, the concentration process can involve high energy usage with resulting high costs.

A typical industrial system for evaporating large amounts of volatiles from a liquid is a multi-effect evaporator which has a number of interconnected evaporator units, each termed an "effect." In a typical multi-effect evaporator system, when a liquid solution fed to a first effect is heated, the heat from the resulting vapor is used to heat the liquid in a subsequent effect. As the number of effects increases, the relative energy required to concentrate a proportional amount of liquid decreases considerably. There is a practical limit to the number of effects used and the number is balanced by factors such as pressure drop, space and cost.

Energy efficiency and performance can be enhanced if the liquid to be concentrated is contained in tubing within the heat transfer portion of the evaporator effects. This is due to increased surface area of the liquid exposed to heat transfer. This tubing, however, can be prone to plugging or fouling that can result in a decrease in energy efficiency, performance, or even a complete shutdown of the system. Currently the applicant knows of no method, that is simple and effective, to automatically isolate which effect or effects of a multi-effect system are most responsible for a loss in energy efficiency or performance. With commonly used methods, a user is typically required to inspect the entire system to locate the problem.

There are many applications requiring that a large amount of liquid be evaporated to yield a liquid product with a desired final concentration. Determination of operating conditions to achieve this concentration typically can be difficult and/or time consuming. Such a determination also typically assumes that the system operates at a particular efficiency and does not factor in the consequences of efficiency loss. Thus, as the evaporators lose efficiency, the production rate typically decreases. A method to quantify an efficiency and/or a concentration of nonvolatiles in the liquid solution for each effect during the evaporation process could provide a convenient method for monitoring system operation, thus leading to an increase in the ease of operation and efficiency/performance of the system.

Because multi-effect evaporators can consume large amounts of heat and steam energy, there remains a need in the art to increase the energy efficiency and performance of such evaporators, and to provide a relatively simple, effective, and inexpensive means to monitor the efficiency and performance.

SUMMARY OF THE INVENTION

One aspect of the invention provides a method involving an evaporator system. The system includes at least two effects, each effect containing a liquid comprising a volatile and a nonvolatile content. At least one effect is provided with an inlet vapor supplying a heat energy sufficient to cause the liquid in the effect to boil to form an outlet vapor. Vapor and liquid temperatures are obtained from at least one effect and an efficiency of at least one effect is determined from the obtained temperatures.

Another aspect of the invention provides a method involving an evaporator system.

The system includes at least two effects, each effect containing a liquid comprising a volatile and a nonvolatile content. At least one effect is provided with an inlet vapor supplying a heat energy sufficient to cause the liquid in the effect to boil to form an outlet vapor. Vapor and liquid temperatures are obtained from at least one effect, and a total nonvolatile content in the liquid from at least one effect is determined from a vapor and a liquid temperature of the effect.

In one embodiment, the invention provides a method involving an evaporator system. The system includes at least two effects, each effect containing a liquid comprising a volatile and a nonvolatile content. The method involves determining at least one vapor temperature and at least one liquid temperature for at least one effect, using the temperatures to determine a heat transfer coefficient for at least one effect, and inferring an efficiency for at least one effect from the heat transfer coefficient.

In one aspect, the invention provides a method involving an evaporator system. The system includes at least two effects, each effect containing a liquid comprising a volatile and a nonvolatile content. The method involves determining at least one vapor temperature and at least one liquid temperature for at least one effect, using the temperatures to determine a boiling point rise for each effect, and determining a nonvolatile content of a liquid in at least one effect from the boiling point rise.

In another embodiment, the invention provides a method involving an evaporator system. The system includes at least two effects, each effect containing a liquid comprising a volatile and a nonvolatile content. The method involves determining at least one vapor temperature and at least one liquid temperature for at least one effect, and using the temperatures to determine both an efficiency and a nonvolatile content of a liquid for at least one effect.

In another embodiment, the invention provides a method involving an evaporator system. The system includes at least two effects, each effect containing a liquid comprising a volatile and a non-volatile content. The method involves determining a heat transfer coefficient for at least one effect during operation of the system and determining an efficiency for at least one effect from the heat transfer coefficient.

In another aspect, the invention provides a method involving an evaporator system, which includes at least two effects, each effect containing a liquid comprising a volatile and non-volatile content. The method involves determining a heat transfer coefficient for at least one effect during the operation of the system and detecting a fouling condition for at least one effect from the heat transfer coefficient.

In another embodiment, the invention provides a method involving an evaporator system, which includes at least two effects, each effect containing a liquid comprising a volatile and a non-volatile content. The method involves obtaining vapor and liquid temperatures from at least one effect and detecting a fouling condition for at least one effect from the obtained temperatures.

In yet another embodiment, the invention provides a method. The method involves obtaining vapor and liquid temperatures from each effect of a multi-effect evaporator system and detecting which effect in the multi-effect evaporator system exhibits a fouling or plugging condition from the obtained temperatures.

Other advantages, novel features, and objects of the invention will become apparent from the following detailed description of the invention when considered in conjunction with the accompanying drawings, which are schematic and which are not intended to be drawn to scale. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

DETAILED DESCRIPTION

Figure 1:
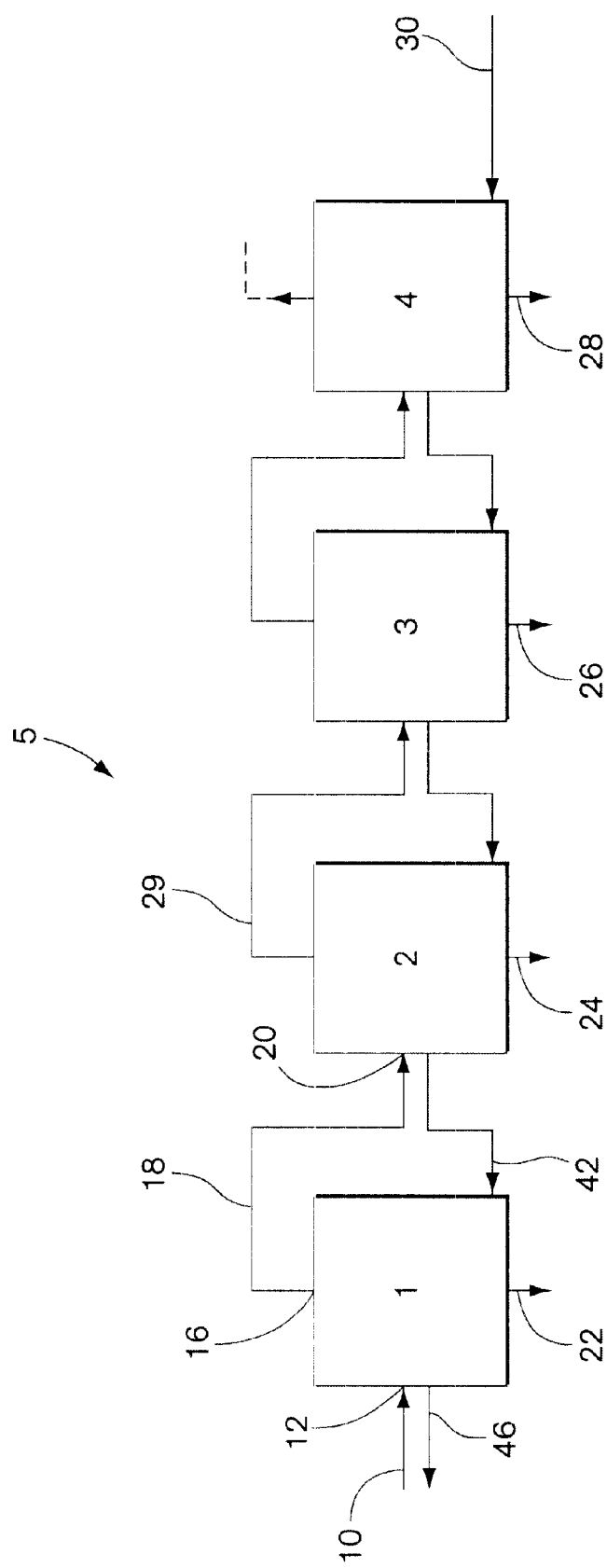
FIG. 1 shows a schematic diagram of a multi-effect evaporator system.

The present invention provides monitoring methods to enhance the energy efficiency and/or performance and/or ease of operation of multi-effect evaporator systems. The inventive methods allow users to isolate problems resulting from plugging or fouling of tubing by a solid or nonvolatile content. The invention also provides methods for quantification of a solid or nonvolatile content present in a liquid stream from an evaporator effect.

One aspect of the present invention provides a method for determining an efficiency of a multi-evaporator system herein also referred to as an "evaporator system". An evaporator system enables large amounts of a liquid feed to be concentrated in non-volatile components in an energy efficient manner. The evaporator system contains a number of evaporator vessels or units which are referred to herein as "effects." During operation, each effect contains a portion of the liquid to be concentrated, the liquid comprising a volatile and a solid or nonvolatile content. The nonvolatile component can be dissolved in the volatile content and/or suspended in the volatile content. The solid can comprise one or more different substances which may have differing solubilities in the volatile content. The concentration process can involve recovery of the nonvolatile content or the volatile content or, preferably a concentrated liquid solution or suspension containing the nonvolatile content. The effects are arranged to provide at least one first effect, at least one end effect and, preferably, at least one intermediate effect. In one embodiment, the effects are arranged in series, i.e. a linear arrangement of effects is provided, the linear arrangement having only one first, one end effect and at least one intermediate effect. In another embodiment, one or more effects can comprise at least two separate evaporator subunits arranged in a parallel configuration. The effects are in "vapor communication" with each other, meaning that at least one vapor stream passes from one effect to at least one adjacent effect, and, in some embodiments, the effects are also similarly in "liquid communication," meaning that at least one liquid stream passes from one effect to at least one adjacent effect. The inventive methods are applicable to a broad class of evaporator types. For example, the effects can comprise many of the evaporator types known in the art, including, but not limited to vertical tube evaporators, falling film evaporators, horizontal tube evaporators, forced circulation evaporators, submerged-tube evaporators, Oslotype evaporators, recirculating evaporators, etc. In one typical construction, each effect includes a heat transfer component including a plurality of hollow tubes surrounded by a jacket or shell. The liquid component, containing the nonvolatiles to be concentrated, may be present in either the shell surrounding the tubes or within one or more tubes of the heat transfer portion of the evaporator. In some embodiments, in order to improve the heat transfer coefficient, the liquid component containing the nonvolatiles to be concentrated is allowed to boil in the hollow tubing of an effect, and a vapor supplying heat energy to boil the liquid is condensed in the shell side of the effect. In preferred embodiments, each effect is in liquid and vapor communication with adjacent effects to provide at least one "vapor pathway," and at least one "liquid pathway" connecting the effects.

The at least one first effect is heated sufficiently by an external energy source to cause the liquid to boil, forming a vapor. The resulting vapor is separated from any residual liquid, for example by gravity settling, and then exits the at least one effect through connective tubing into another effect, for example an adjacent effect, where the heat contained in the vapor can be used to heat the liquid in the other effect. Thus, by allowing heat energy supplied by the vapor to heat subsequent effects, heat energy is conserved and the total heat required to concentrate a given volume of liquid is minimized.

FIG. 1 shows a schematic of one embodiment of a multi-effect evaporator system 5 having four effects arranged in series. In the embodiment shown, the system comprises a continuous or steady flow system having a backward liquid feed arrangement. In such an arrangement, the vapor component is fed forward (i.e. from the first effect 1, to subsequent effects 2 to 3 to 4 etc), while the liquid containing the nonvolatile content (liquor) passes through the effects in the opposite direction (i.e. from the last effect 4, to 3 to 2 to 1 as shown), and, thus, the concentration of the non-volatile component in the liquid increases from the last effect to the first. Alternatively, the system can have a forward feed arrangement, in which the liquid and vapor streams move from effect to effect in the same direction, so that the liquid becomes more concentrated from the first effect to the last. Other liquid feed arrangements are also possible, for example a parallel feed arrangement where there is no liquid communication between effects and, instead, a portion of the total liquid feed is fed individually to each effect. Liquid and/or vapor streams may also be partially or completely recycled to the same effect, and/or may be in fluid communication with non-adjacent effects. In another embodiment, the effects are not operated in a continuous flow mode but instead operate in a batch mode where effects 1, 2, 3 and 4 each contain a portion of the liquid to be concentrated. The skilled artisan will readily envision other combinations and arrangements not specifically mentioned herein that, nonetheless, are within the spirit and scope of the present invention.

An energy source 10 is provided to heat the liquid fed via line 42 to effect 1. The energy source in FIG. 1 is provided as steam and enters effect 1 through inlet 12. The steam entering effect 1 can also be termed an "inlet vapor." The steam heats the liquid from line 42 (which in this case is the outlet liquid from effect 2) fed to effect 1 to a sufficient extent that the liquid boils and a vapor forms. Effect 1 is constructed, by using designs well known in the art, such that heat transfer occurring from the steam to the liquid results in at least a portion of the steam condensing to a liquid phase that exits the evaporator through line 22. The vapor resulting from the boiling of the liquid feed exits effect 1 through outlet 16. It is the continued removal of the vapor from the liquid stream that constitutes the concentration process. The vapor exiting outlet 16 can be termed an "outlet vapor". The outlet vapor consequently travels via line 18 to enter effect 2 through inlet 20. In effect 2, this vapor is now acting as an "inlet vapor" and can function as the steam energy source for effect 2 to supply energy for the evaporation process. The concentrated liquid or "outlet liquid" component is separated within effect 1 from the outlet vapor 18 and is recovered as a concentrated liquid product in line 46. In the embodiment illustrated, the initial dilute liquid feed to the multi-effect system is fed to effect 4 through line 30.

Figure 2:
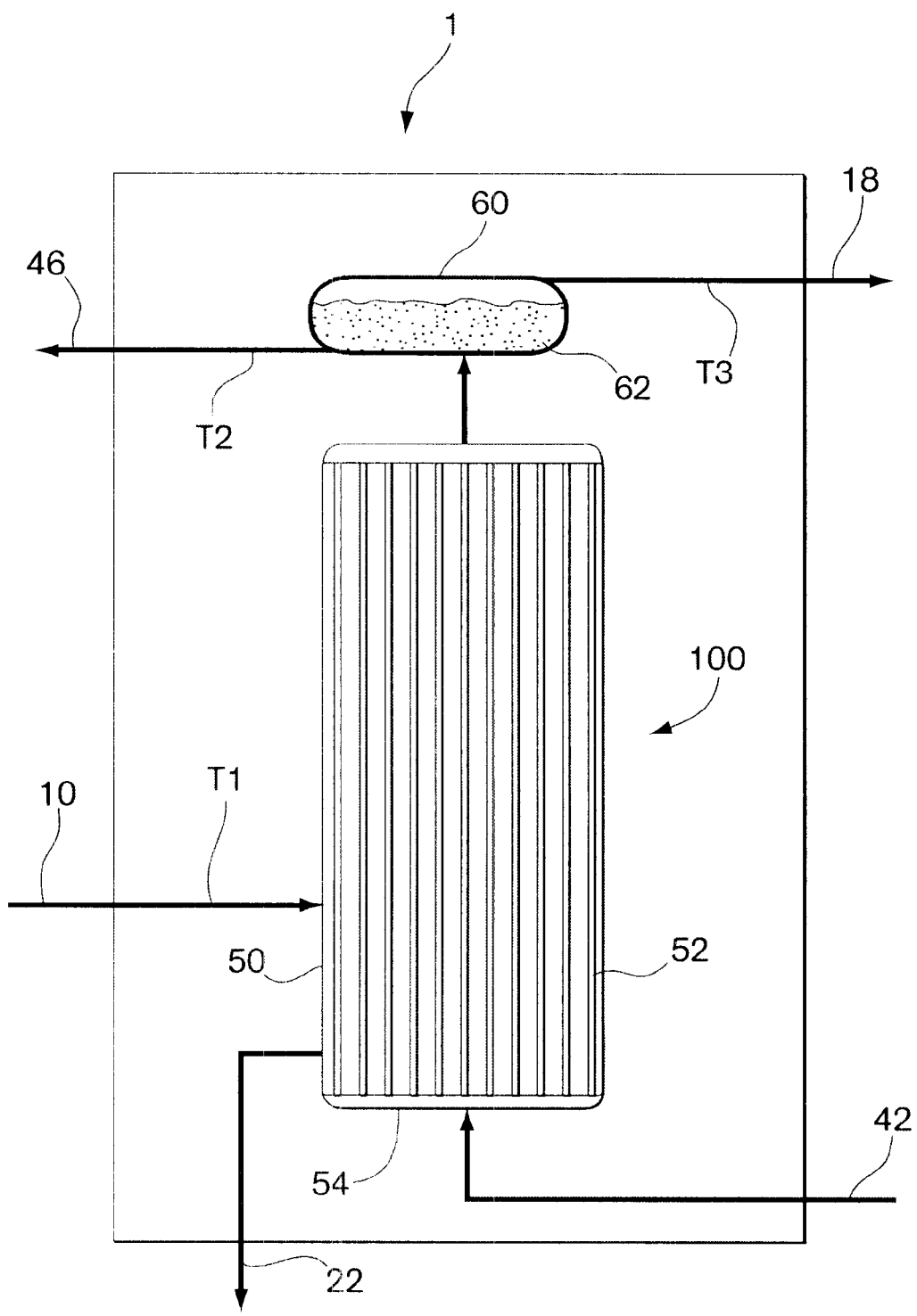
FIG. 2 shows a schematic diagram of one effect, highlighting points of temperature measurements.

The method of the present invention involves obtaining a plurality of temperature measurements for at least one effect and preferably for each effect. FIG. 2 shows a close-up schematic of one embodiment of effect 1. As in FIG. 1, many components, which are conventional in design and not part of the present invention, have been omitted or simplified, including many elements of a heat exchanger 100 and vapor-liquid separator 60. Steam enters the shell 50 of the heat exchange element 100 via line 10, the steam having an inlet saturation temperature T1. As discussed below, the vapor temperatures referred to herein are generally those for a saturated vapor, which can be determined from a measured vapor pressure by conventional means well known in the art, and any superheat contained in the vapor is not taken into account. The steam transfers heat energy to the liquid, fed via line 42, through tubes 52 in heat exchange element 100, and boils the liquid. The condensed steam exits the heat exchange element 100 through line 22, and the outlet vapor, in line 18, is separated from the outlet liquid product, in line 46, in component 60. The outlet temperature of the liquid is shown as T2 and is assumed herein to be nearly equal to the boiling point of the outlet liquid. Released vapor exits effect 1 through line 18 at outlet saturation temperature T3.

Heat from the condensing steam is transferred to the liquid, causing the liquid to boil. In general, a heat transfer rate for each effect can be calculated by using equation 1 below:

$$Q = UA\Delta T \quad (1)$$

where Q is the heat transfer rate, U is a heat transfer coefficient, A is an area of a heating surface, for example the area of a heat transfer surface contacting the liquid to be heated, and $\Delta T$ is a temperature difference between the steam and the boiling liquid. In one embodiment (illustrated), the liquid is contained in a plurality of tubes 52, and the steam contacts the tubes. A total surface area of the tubes contacting the liquid is the inputted value, A, in equation 1.

Referring to FIG. 2, when the evaporator system reaches a steady state, equation (1) can be written as: $Q_1 = U_1 A_1 \Delta T_1$. The term $\Delta T$, is determined by taking a difference between temperature Ti and temperature T2, i.e. $\Delta T_1 = T1 - T2$. In addition, in many practical systems where heat losses are small or evenly distributed, and sensible heat effects (for example, due to superheat in the vapor phase) are small compared to latent heat effects, practically all of the heat Q that is expended in creating vapor in one effect is subsequently given up when this same vapor condenses in the following effect. Under such operating conditions, at steady state, the heat transfer rate, Q, will be approximately equal for effects 1, 2, 3 and 4, resulting in equation 2:

$$Q_1 = Q_2 Q_3 = Q_4 \quad (2)$$

Equation 3 follows as:

$$U_1 A_1 \Delta T_1 = U_2 A_2 \Delta T_2 = U_3 A_3 \Delta T_3 = U_4 A_4 \Delta T_4 \quad (3)$$

In one embodiment, the method to monitor the efficiency is as follows. Initially, ideal heat transfer coefficients are obtained for each effect to be monitored. Ideal heat transfer coefficients, U, can be obtained when the system is new or when all the effects to be monitored are in essentially ideal working order. Values for U and $\Delta T$ are dependent on the particular operating conditions of the system and standardized ideal values should be obtained for each set of operating conditions of interest. The area, A, is usually a known value dependent on the system design. The heat transfer rates can be calculated (discussed below) using measured process variables (e.g. steam consumption and liquid flows), by performing an overall mass and energy balance on the system, and then using equations 1 through 3 (along with measured intermediate stream temperatures to determine $\Delta T$'s) to determine values for the individual heat transfer coefficients U's for the effects. Subsequently, during normal operations of the system the heat transfer coefficients for each effect to be monitored, $U_1$, $U_2$, $U_3$ and $U_4$ can be similarly calculated and can function as monitored values. In one embodiment, an "efficiency" of the system, and each monitored effect therein, can be inferred from the calculated value for the heat transfer coefficient, and can be monitored by surveying heat transfer coefficients for each monitored effect over time during operation of the system.

In typical effect designs, such as shown in FIG. 2, the liquid feed can flow through a plurality of tubes to increase a heat exchange surface area in contact with the liquid. Over a period of time under normal operating conditions, the heat transfer coefficient will tend to decrease as solid nonvolatile content accumulates on the heat transfer surface of the elements reducing heat transfer efficiency. For example sediment or films plugging the tubes can create an additional resistance for heat transfer which requires extra energy to overcome. The plugging or fouling of tubes can also result in an increase in heat transfer resistance by causing a decrease in the effective heat transfer area A. Eventually, tubes in one or more effects can become plugged or seriously fouled by a solid nonvolatile content, resulting in a significant reduction in the heat transfer coefficient, and/or a serious loss of efficiency for such elements. If only one effect has seriously plugged or fouled tubing, an entire inspection of the system has usually been required for the user to identify the problematic effect. In the present invention, the user can instead monitor the heat transfer coefficient values (U's) over time for at least one effect and preferably for each effect and compare them with their ideal values. A problematic effect will show a greater rate of decrease in heat transfer coefficient values than non-problematic effects. The invention allows the user to detect and isolate the problem and pinpoint the particular effect, without having to inspect the entire system. Other advantages of the monitoring system include prevention of serious plugging. A decrease in heat coefficient values can alert the user that fouling has begun and preventative measures can be taken.

The inventive method advantageously provides, in one embodiment, a method of monitoring the efficiency and performance of the individual effects in a multi-effect evaporator system which can require that only two temperatures (a vapor and a liquid temperature) be monitored for each effect to be monitored. The method entails, in one embodiment, performing an overall mass and energy balance on the system to determine at least one heat transfer rate, which according to equation 2 will be approximately equal for each effect. Techniques for performing such heat and mass balance calculations are well known in the art of Chemical Engineering (see for example, McCabe, W. L., et al., "Unit Operations of Chemical Engineering", 4th ed., McGraw-Hill, New York; 1985) and will not be further discussed herein. The method further involves monitoring at least two, and preferably two, stream temperatures for each monitored effect so that $\Delta T=T1-T2$ in equation 1 can be determined for each monitored effect. Preferably, the temperatures so monitored comprise the outlet vapor saturation temperature T3 and the outlet liquid temperature (boiling temperature) T2. Referring to FIG. 1, it is seen that the outlet vapor stream in line 18 from effect 1 acts as the inlet vapor stream in line 20 to down stream effect 2, and, thus, the inlet vapor saturation temperature T1 for effect 2 will be approximately equal to the outlet vapor saturation temperature T3 for effect 1. Thus, in the embodiment illustrated, equating the inlet vapor temperature T1 for an effect to the outlet vapor temperature T3 from the preceding effect enables the user to determine $\Delta T$ for each effect without having to separately measure T1 for each effect. T1 for effect 1 is typically known from the saturation temperature of the steam, which may be determined from a measured steam inlet pressure, fed to the system via stream 10. The heat transfer coefficient U can then be determined for each monitored effect from the calculated heat transfer rate Q, the known heat transfer area A, and $\Delta T$ for the effect using equation 1. The heat transfer coefficients so determined for each monitored effect are preferably monitored and compared to the previously discussed ideal values. Problems with an individual effect are characterized by a decrease in the calculated heat transfer coefficient U for that effect.

The heat transfer coefficient values can be displayed as the actual values. In other embodiments, scaled values may be displayed. For example, an ideal heat transfer coefficient can have a relative value of "100" and a system of zero efficiency may have a relative value of "0". As previously discussed, the vapor temperatures may be advantageously obtained from vapor pressure measurements and converted to saturation temperatures by using standard methods known to those of ordinary skill in the art.

FIG. 1 depicts effects 1, 2, 3 and 4 as having the same size. The present method, however, can also be applied when the effects of a system have different sizes and/or have different liquid and/or vapor capacities. Area, A, can also differ from effect to effect. In FIG. 1, the effects are arranged in series. In other embodiments, at least one effect can comprise at least two separate evaporator subunits arranged in a parallel configuration. A parallel arrangement can allow for a greater quantity of liquid feed to be concentrated at a particular point or effect in the evaporation process. Although FIG. 1 shows a multi-effect evaporator having four effects, the present invention can be used for any number of effects, depending on the liquid to be concentrated, cost factors etc. The volatile component of the liquid stream may also be comprised of other components besides or in addition to water. In addition, the simplifying assumptions made in the analysis above were done for simplicity and clarity so that the inventive methods would be easier for the reader to follow. However, such simplifying assumptions need not be valid for the inventive methods to be useful. Systems with significant heat losses, sensible and other heat effects, unequal heat or mass flow distributions, and the like are still amenable to the monitoring methods discussed herein. In such cases, the calculation and/or simulation procedures required to determine heat transfer rates, heat transfer coefficients, and/or other calculated parameters are more involved and complex but are within the skill and knowledge of one of ordinary skill in the art of chemical engineering.

Another aspect of the invention provides a method for monitoring a content or concentration of the nonvolatile substances in the liquid. Referring to FIG. 2, the difference between T2, the boiling point of the liquid, and T3, the outlet vapor saturation temperature, represents a boiling point rise (BPR) in the liquid (relative to a pure liquid) caused by the presence of the nonvolatile component (BPR=T2−T3). T3 is the saturated vapor temperature of the outlet vapor (which may be advantageously determined from the vapor pressure of the outlet vapor), which is essentially independent of nonvolatile concentration in the liquid. T2, however, increases as the liquid is concentrated, due to the greater amount of nonvolatile content. A BPR value is thus proportional to, and may be used to represent, a percentage of nonvolatile content in a liquid. A plot of BPR versus % nonvolatile content is unique for each liquid having volatile and nonvolatile content. In the present inventive method, a BPR is determined for each monitored effect from the two stream temperatures (T3 and T2) already measured, as previously discussed, for determination of heat transfer coefficients and the performance/efficiency for the effect. The BPR thus determined can then be used to determine the nonvolatile concentration in the outlet liquid stream for each monitored effect.

Thus, according to the inventive methods, by monitoring only two temperatures for a given effect (T3 and T2), both efficiency and non-volatile concentration in the liquid may be determined for the effect.

In one embodiment, the user can monitor the percentage of solid or nonvolatile content present in the liquid by viewing BPR values directly. In another embodiment, the invention can directly calculate a percentage of nonvolatile content in the mixture (e.g. from an input standard curve). The method can provide sufficient information to enable a user to achieve a desired concentration of nonvolatile content. For example, concentrated orange juice requires the product to have a precise liquid content to which a consumer can add a specified amount of water. It should be appreciated that determination of nonvolatile content using the inventive methods can yield a significant cost savings compared to typical prior art techniques that directly measure the nonvolatile content of the liquid.

Those skilled in the art would readily appreciate that all parameters and arrangements listed herein are meant to be exemplary and that actual parameters and arrangements will depend upon the specific application for which the methods of the present invention are used. It is, therefore, to be understood that the foregoing embodiments are presented by way of example only and that, within the scope of the appended claims and equivalents thereto, the invention may be practiced otherwise than as specifically described.

What is claimed is:

1. A method comprising:
providing an evaporator system including at least two effects, each of the at least two effects containing a liquid mixture comprising a volatile and a nonvolatile content;
providing at least one of the at least two effects with an inlet vapor supplying energy sufficient to cause the liquid mixture in the effect to boil to form an outlet vapor;
allowing evaporation to achieve a steady state between the at least two effects;
obtaining a vapor temperate and a liquid mixture temperature from the at least one of the at least two effects; and
determining a tot nonvolatile content in the liquid mixture from the at least one of the at least two effects from the vapor temperature and the liquid mixture temperature of the at least one of the at least two effects.

2. A method as in claim 1, further comprising: infrerring an efficiency of the at least one of the at least two effects from obtain temperatures.

3. A method as in claim 2, wherein the efficiency of each of the at least two effects is inferred in the inferring step.

4. A method as in claim 2, wherein the inferred efficiency is proportional to a heat transfer coefficient U, obtained from the equation $Q=UA\Delta T$, where Q is a heat transfer rate, A is a surface area of hear transfer contacting the liquid mixture and $\Delta T$ is a difference of an inlet vapor temperature minus a boiling temperature of the liquid mixture.

5. A method as in claim 1, wherein the at least two effects comprise at least one first effect and at least one end effect, the effects being in vapor communication with adjacent effects to provide at least one vapor pathway.

6. A method as in claim 5, wherein the at least two effects further comprise at least one effect intermediate the at least one first effect and the at least one end effect.

7. A method as in claim 6, wherein the effects are arranged in series.

8. A method as in claim 1, wherein the at least one of the at least two effects comprises at least two separate evaporator subunits, said subunits arranged in a parallel configuration.

9. A method as in claim 1, wherein the obtained vapor temperature is an outlet vapor saturation temperature.

10. A method as in claim 9, wherein said outlet vapor saturation temperature is determined from a measured outlet vapor pressure.

11. A method as in claim 1, wherein the obtained liquid mixture temperature is a boiling temperature of the liquid mixture.

12. A method as in claim 1, wherein in the obtaining step, the liquid mixture and vapor temperatures are obtained for each of the at least two effects.

13. A method as in claim 12, wherein in the obtaining step, one vapor and one liquid mixture temperature are obtained from each of the at least two effects.

14. A method as in claim 1, further comprising:
determining a heat transfer coefficient for the at least one of the at least two effects using sad temperatures; and
inferring an efficiency for the at least one of the at least two effects from said heat transfer coefficient.

15. A method as in claim 1, further comprising:
determining a boiling point rise for the at least one of the at least two effects using said temperatures.

16. A method as in claim 1, further comprising:
determining both an efficiency and the total nonvolatile content in said liquid mixture for the at least one of the at least two effects from said temperatures.

17. A method as in clam 16, wherein both the efficiency and the total nonvolatile content in said liquid mixture is determined for each of determined least two effects from said temperatures.

18. A method as in claim 1, filer comprising:
determining a heat transfer coefficient forte at least one of the at least two effects during operation of the system; and
detecting a fouling condition for the at least one of the at least two effects from said heat transfer coefficient.

19. A method as in claim 18, wherein the heat transfer coefficient for each of the at least two effects is determined during operation of the system.

20. A method as in claim 1, further comprising:
detecting a fouling condition for the at least one of the at least two effects from the obtained temperatures.

21. A method as in claim 1, further comprising:
detecting which of said at least two effects exhibits a fouling or plugging condition from the obtained temperatures.

22. A method as in claim 1, wherein the obtaining step occurs at steady state.

23. A method, comprising:
providing an evaporator system including at least two effects, each of the at least two effects containing a liquid mixture comprising a volatile and a nonvolatile content;
providing at least one of the at least two effects with an inlet vapor supplying energy sufficient to cause the liquid mixture in the at least one of the at least two effects to boil to form an outlet vapor;
obtaining a liquid mixture temperature from the at least one of the at least two effects;
determining an outlet vapor pressure from the at least one of the at least two effects; and
determine a total nonvolatile content in the liquid mixture from the at least one of the at least two effects from The vapor pressure and the liquid mixture temperature of the at least one of the at least two effects.

24. A method as in claim 23, wherein the at least one of the at least two effects comprises at least two separate evaporator subunits. said subunits arranged in a parallel configuration.

25. A method as in claim 23, wherein the total non-volatile content in the liquid mixture is proportional to boiling point rise, BPR, obtained from the equation $BPR=T2-T3$, where is a boiling temperature of the liquid mixture and T3 is an outlet vapor saturation temperature of the at least one of the at least two effects.

26. A method as in claim 23, wherein the obtained liquid mixture temperature is a boiling temperature of the liquid mixture.

27. A method as in claim 23, wherein an outlet vapor saturation temperature is determined from the outlet vapor pressure.

28. A method as in claim 27, further comprising inferring an efficiency of the at least one of the at least two effects from the liquid mixture and outlet vapor saturation temperatures.

* * * * *

UNITED STATES PATENT AND TRADEMARK OFFICE
CERTIFICATE OF CORRECTION

PATENT NO. : 6,471,823 B1
DATED : October 29, 2002
INVENTOR(S) : Wade C. Stewart It is certified that error appears in the above-identified patent and that said Letters Patent is hereby corrected as shown below:

Column 6,
Line 6, "$\Delta T$" should read -- $\Delta T_1$ --
Line 7, "Ti" should read -- $T_1$ --
Equation 2, the equation should read -- $Q_1 = Q_2 = Q_3 = Q_4$ --

Column 9,
Line 19, "temperate" should read -- temperature --
Line 22, "tot" should read -- total --
Line 26, "infrerring" should read -- inferring --
Line 28, "obtain" should read -- obtained --
Line 34, "hear" should read -- heat --
Line 65, "sad" should read -- said --

Column 10,
Line 8, "clam" should read -- claim --
Line 10, "of determined" should be deleted and replaced with -- of the at --
Line 12, "filer" should read -- further --
Line 13, "forte" should read -- for the --
Line 43, "determine" should read -- determining --
Line 44, "The" should read -- the --
Line 53, after "where" please insert -- T2 --

Signed and Sealed this

First Day of April, 2003

JAMES E. ROGAN
*Director of the United States Patent and Trademark Office*